United States Patent [19]
Martin et al.

[11] Patent Number: 6,055,788
[45] Date of Patent: May 2, 2000

[54] LONGITUDINAL FRAME SUPPORT FOR A COMMERCIAL VEHICLE AND PROCESS FOR PRODUCING THE SAME

[75] Inventors: Gerd Martin, Stuttgart; Michael Priwizter, Esslingen, both of Germany

[73] Assignee: DaimlerChrysler AG, Germany

[21] Appl. No.: 09/127,914

[22] Filed: Aug. 3, 1998

[30] Foreign Application Priority Data

Aug. 2, 1997 [DE] Germany .......................... 197 33 470

[51] Int. Cl.[7] .............................. E04C 3/32; B60D 21/00
[52] U.S. Cl. ...................... 52/731.6; 52/729.5; 52/730.1; 52/735.1; 52/737.6; 52/745.19; 52/636; 52/658; 29/897.2; 29/897.35; 296/203.01
[58] Field of Search ................... 52/729.1, 729.2, 52/729.3, 729.5, 730.1, 731.1, 731.6, 735.1, 737.6, 737.1, 745.19, 636, 658; 29/897.2, 897.35, 897, 514, 462; 228/173.6; 105/414; 280/798, 800, 785; 296/203.01

[56] References Cited

U.S. PATENT DOCUMENTS

| | | | |
|---|---|---|---|
| 1,017,927 | 2/1912 | Tesseyman | 52/735.1 |
| 1,644,519 | 10/1927 | Gurisch | 52/658 X |
| 2,052,535 | 8/1936 | Sherman | 280/800 X |
| 2,218,122 | 10/1940 | Scheller et al. | 52/731.6 X |
| 2,355,707 | 8/1944 | Boer | 52/731.6 |
| 2,748,723 | 6/1956 | Swann | 52/731.6 X |
| 2,784,983 | 3/1957 | Dean | 52/731.6 X |
| 2,820,645 | 1/1958 | Schilberg | 52/735.1 X |
| 4,206,536 | 6/1980 | Hammond et al. | 29/402.11 |
| 4,481,703 | 11/1984 | Scott | 29/525.06 |
| 4,726,166 | 2/1988 | DeRees | 52/731.6 X |
| 4,969,250 | 11/1990 | Hickman et al. | 29/462 X |
| 5,499,480 | 3/1996 | Bass | 52/731.1 X |

FOREIGN PATENT DOCUMENTS 1053330  3/1959  Germany .............................. 52/735.1

Primary Examiner—Laura A. Callo
Attorney, Agent, or Firm—Evenson, McKeown, Edwards & Lenahan, P.L.L.C.

[57] ABSTRACT

A profiled support member for use in a vehicle frame has a central web, flanked on at least one side by at least one angled-off flange, and is provided with at least one angled portion. The central web and the at least one profiled leg are produced separately and connected rigidly to one another. The central web is configured in the form of a plate and is bent to form at least one angled portion. The at least one profiled leg is configured as a single-piece blank which is continuous over the length of the profiled support and has a continuous flange web, which follows the at least one angled portion, and a plurality of connecting lugs which adjoin one another and are separated from one another in the region of bending edges of the central web. The connecting lugs are bent at right angles to the flange web and are connected rigidly to an associated longitudinal side of the central web.

9 Claims, 2 Drawing Sheets

LONGITUDINAL FRAME SUPPORT FOR A COMMERCIAL VEHICLE AND PROCESS FOR PRODUCING THE SAME

This application claims the priority of German patent document 197 33 470.9, filed Aug. 2, 1997.

BACKGROUND AND SUMMARY OF THE INVENTION

The invention relates to a supporting frame of a commercial vehicle, and in particular to a longitudinal frame support having a U-shaped profile, with a longitudinally extending central web which is flanked on at least one side by at least one angled profiled leg. The profiled support is provided with at least one angled portion. The invention also provides a process for producing the same.

A known profiled support of this generic type, used as a longitudinal frame support for a heavy goods vehicle, has a central web that is vertically disposed (in the installed state), a top flange, configured as a profiled leg, and a bottom flange, which is also configured as a profiled leg. The profiled longitudinal frame support is formed by subjecting a single-piece sheet-steel plate to different pressing and bending steps. In particular in the axle region of the supporting frame for the purpose of providing sufficient space around the axle and wheels, it may be necessary for the longitudinal frame support to be provided with corresponding angled portions in the vertical or transverse direction of the vehicle.

The shaping the sheet-steel plate to give it an angled profiled support produces a high degree of material deformation and internal stressing in the region of the angled portions. If the profiled supports are subjected to relatively long-lasting alternating loading, such deformation and internal stressing may constitute starting points for cracks, which reduce the service life of the supports.

The object of the invention is to provide a profiled support (and a process for manufacturing the same) which reliably avoids internal stressing and material deformation in the region of angled portions, and provide favourable preconditions for a longer service life of the profiled supports.

This object is achieved according to the invention, by producing the central web and the at least one profiled leg as separate components and rigidly connecting them to one another, with the central web being configured in the form of a plate, and being bent correspondingly at a point which is adjacent the at least one angled portion. The at least one profiled leg is configured as a single-piece blank which is continuous over the length of the profiled support. It has a continuous flange web, which follows the at least one angled portion, and a plurality of connecting lugs which adjoin one another and are separated from one another in the region of the bends of the central web. The connecting lugs are bent at right angles to the flange web and are connected rigidly to an associated longitudinal side of the central web.

Separating the profiled support into a central web and profiled legs makes it possible to achieve angled portions without generating internal stressing and material deformation of the profiled support. According to the invention, the separate components are formed into the desired shape simply by rectilinear bending edges, which are coordinated with one another and located in different horizontal and vertical planes; thereafter, the components are joined together. The fact that the central web and profiled legs are formed as separate components also makes it possible to use different materials and/or different material thicknesses with respective components, and in particular, to use lightweight materials for the central web.

The invention is preferably suitable for longitudinal frame supports. However, the profiled support may also be designed in the form of an angled inset in an angled region of the respective longitudinal frame support. The invention provides an increased service life for the profiled support. Moreover, considerably simpler production is achieved because only readily available tools are used, only a material-cutting device and a bending device being required. This gives increased flexibility for different variations of profiled supports, in particular longitudinal frame supports.

In one configuration of the invention, the central web is provided with at least one indentation at least on a longitudinal side, and the flange web of the associated profiled leg is bent correspondingly in the region of the indentation. An associated connecting lug is coordinated with the length of the indentation, which further improves the shaping of the profiled support, without increased cost or complexity.

In a further configuration of the invention, the central web and the at least one profiled leg are produced from different materials. In this case, a lightweight material in particular (aluminium or magnesium) can be used for the central web, which is exposed mostly to shear loading during operation. The at least one profiled leg is preferably produced from a sheet-steel plate.

In a further configuration of the invention, the at least one profiled leg is connected rigidly to the central web by a plurality of fastening elements, such as rivets or screws, which are distributed over the length of the profiled support. This is a particularly reliable type of connection, which (in contrast to welded or soldered connections) avoids the build up of internal stress. Screws provide a reasonable arrangement for the profiled legs and central webs.

The object of the invention is also achieved by the manufacturing process in which, in the region of the angled portion, a planar central web is bent out of its plane in accordance with the progression of the angled portion. A profiled leg, which is continuous over the length of the profiled support and has previously been cut to size from a single-piece plate is fitted to at least one longitudinal side of the central web. A plurality of connecting lugs and a continuous flange web which follows the angled portion are formed in the process, with the connecting lugs separated from one another in the longitudinal direction of the profiled leg by incisions which are provided adjacent the bending edges of the at least one angled portion. The connecting lugs are bent at right angles to the flange web and are connected rigidly to the corresponding longitudinal side of the central web.

The process according to the invention permits extremely cost-effective production of the profiled support, since all that need be provided are sheet-metal plates for the central web and the profiled legs, which are correspondingly cut to size and shaped by means of relatively simple and cost-effective production steps such as cutting and bending. Since simple straight bending edges are formed according to the invention, generation of high internal stress in the respective components is avoided.

Other objects, advantages and novel features of the present invention will become apparent from the following detailed description of the invention when considered in conjunction with the accompanying drawings.

DETAILED DESCRIPTION OF THE DRAWINGS

Figure 1:
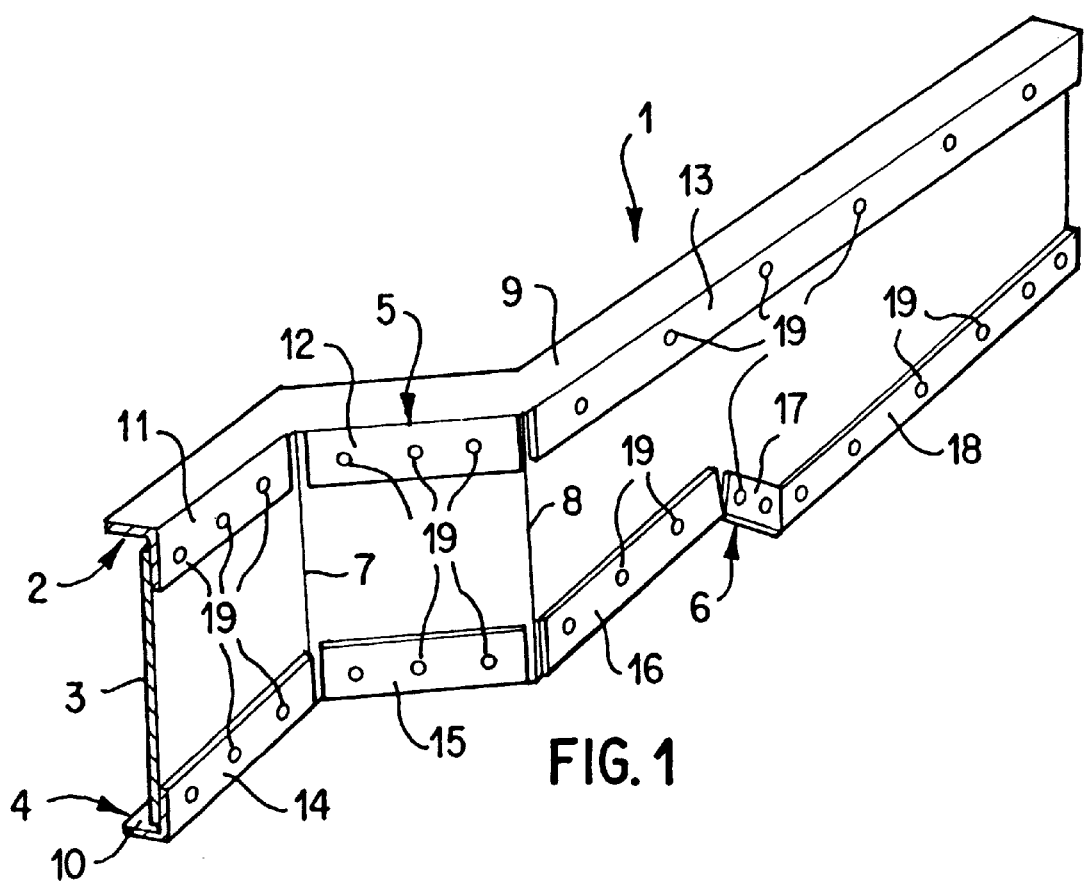
FIG. 1 is a perspective view of an embodiment of a profiled support according to the invention, in the form of a section of a longitudinal frame support which is provided with an angled portion and an indentation.

A section of a longitudinal frame support according to FIGS. 1 to 4 is intended for use in a supporting frame of a commercial vehicle, in particular of a heavy goods vehicle. The section 1 of the longitudinal frame support is provided on a longitudinal side of the supporting frame. The opposite longitudinal frame support of the supporting frame is constructed in mirror symmetry with respect to a vertical vehicle centre plane, but is otherwise identical to the section 1 of the longitudinal frame support. The longitudinal frame support 1 is made up of a central web 3, which is aligned vertically in the installed state, and two profiled legs 2, 4 which are fitted to the opposite longitudinal sides of the central web 3. The profiled leg 2 forms a top boom, and the profiled leg 4 forms a bottom boom, of the section 1 of the longitudinal frame support. Both the central web 3 and the profiled legs 2 and 4 are produced from sheet-metal plates.

In the exemplary embodiment illustrated, the central web 3 is produced from a light metal and the profiled legs 2 and 4, in contrast, are produced from sheet steel. In the installed state, the section 1 of the longitudinal frame support extends in the longitudinal direction of the vehicle and, in the illustration according to FIGS. 1 to 4, has an angled portion 5 which runs in the transverse direction of the vehicle. The longitudinal frame support may of course be provided with further angled portions (not shown), in particular in the axle regions of the supporting frame, such further angled portions running in the transverse direction or in the vertical direction of the vehicle.

Figure 5A:
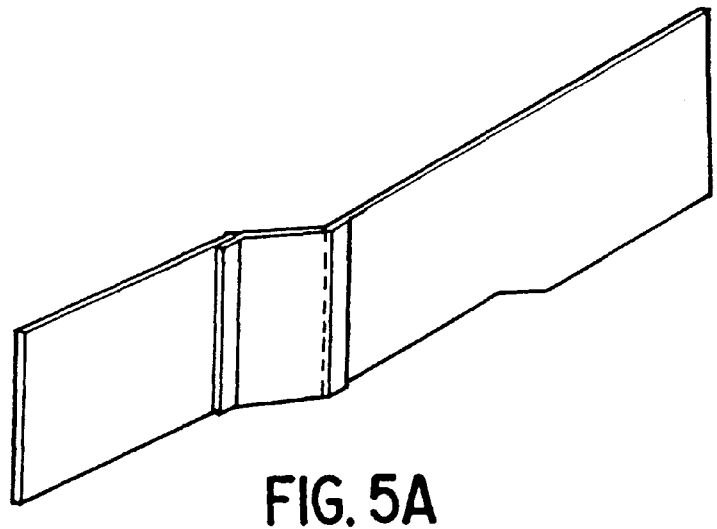
FIGS. 5a and 5b show an embodiment of the central web which is made up of a plurality of a parts which adjoin one another in the longitudinal direction of the vehicle.
Figure 5B:
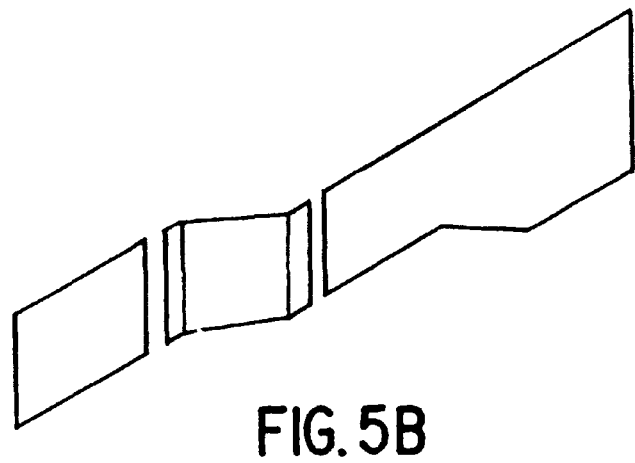

In the region of the angled portion 5, the central web 3 is bent around two mutually parallel bending edges 7 and 8, which run in the vertical direction of the vehicle. The angles of the bends at the bending edges 7 and 8 are selected such that adjacent sections of the central web 3 adjoin one another at the same angles but with different signs. In the exemplary embodiment illustrated, the central web 3 is produced from a single-piece sheet-metal plate and is angled correspondingly in the region of the bending edges 7 and 8. The central web may also be made up of a plurality of parts which adjoin one another in the longitudinal direction of the vehicle, as shown in FIGS. 5a and 5b.

Figure 2:
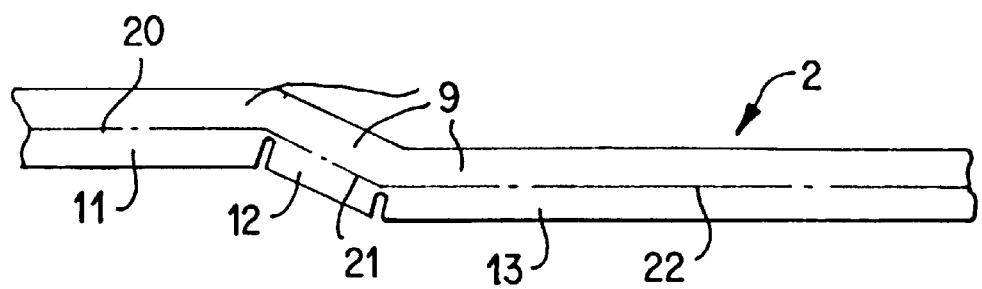
FIG. 2 shows the blank of a profiled leg which forms the top boom of the section of the longitudinal frame support according to FIG. 1.
Figure 3:
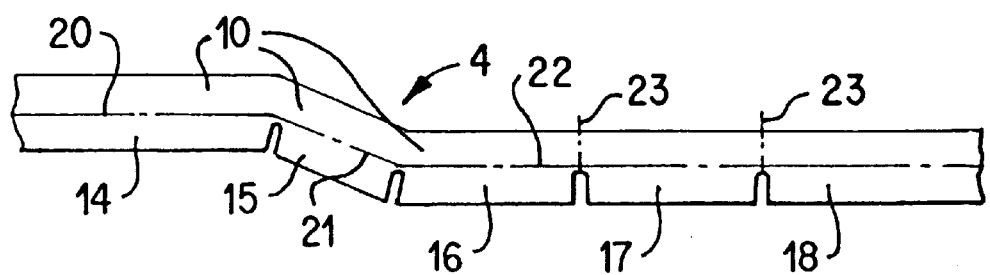
FIG. 3 shows a further blank, similar to FIG. 2, for forming the bottom boom in FIG. 1.
Figure 4:
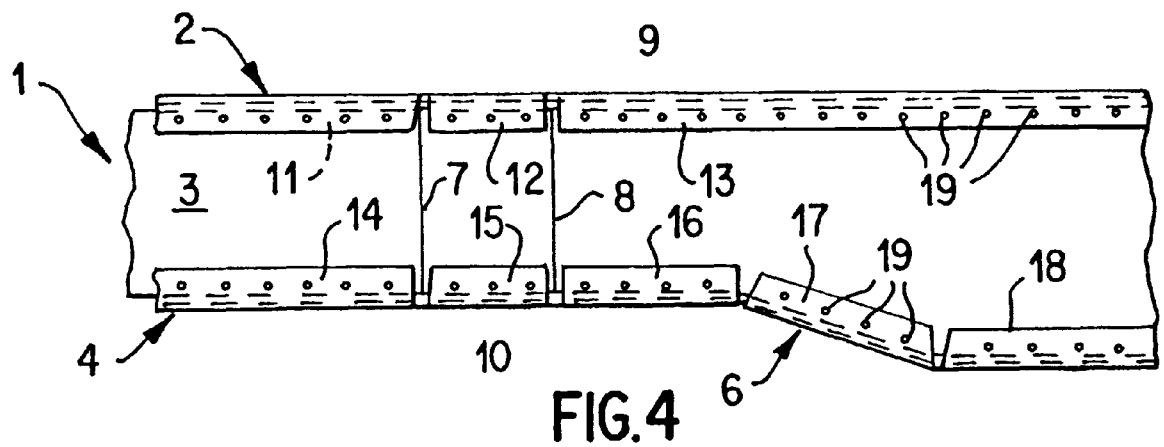
FIG. 4 shows a side view of the profiled support according to FIG. 1.

According to FIGS. 2 and 3, both the profiled leg 2, which forms the top boom, and the profiled leg 4, which forms the bottom boom, are configured as planar blanks in the form of a single-piece sheet-metal plate. In the area of angled portion 5, both of the profiled legs 2 and 4 follow the angled progression, and are cut to size correspondingly. Each of the profiled legs 2, 4 thus has two sections which run in the longitudinal direction of the vehicle and are offset laterally with respect to one another and are connected by an obliquely running leg section. All of these leg sections merge one into the other and are arranged in a common plane.

In the longitudinal direction, the two profiled legs 2, 4 have a continuous flange web 9, 10 on one side, which follows the angled-portion region in a correspondingly angled manner, and (in the installed state of the section 1 of the longitudinal frame support) projects at right angles from the central web 3 in each case. The profiled legs 2 and 4 of the top boom and of the bottom boom of the section 1 of the longitudinal frame support are of essentially identical configuration, with the two flange webs 9 and 10 corresponding to one another. Formed on the opposite side of each profiled leg 2, 4 are a plurality of connecting lugs 11 to 18, which adjoin one another in the longitudinal direction of the profiled leg 2, 4 and are each separated from one another by incisions in the transverse direction of each profiled leg 2, 4 as far as a centre longitudinal axis of the respective profiled leg 2, 4. In the two profiled legs 2, 4, the connecting lugs 11 to 18 are bent, to one side in each case, at right angles to the respective flange webs 9, 10, with corresponding bending edges 20 to 22 located in the region of the centre axis of each profiled leg 2, 4. The respectively rectilinear bending edges 20, 21, 22 thus permit the connecting lugs 11, 12, 13 to be set at right angles, so that the connecting lugs 11 to 18 engage in parallel over the respective longitudinal sides of the central web 3.

In the region of the bottom boom (formed by the profiled leg 4), the section 1 has an additional indentation or angled area 6. In order to provide this indentation 6, the plate of the central web 3 is simply cut in a correspondingly oblique manner in this region. For the profiled leg 4, which flanks the indentation 6, a connecting lug 17 is provided in the region of the indentation by two additional incisions provided at the corners of the indentation 6. The connecting lug 17 is separated by the wedge-shaped incisions from the connecting lugs 16, 18 which adjoin to the front and rear. Furthermore, in the region of the wedge-shaped incisions, the flange web 10 follows the progression of the indentation 6 by means of two bends adjacent the incisions, in the region of the bending edges 23, which run in the transverse direction of the vehicle. It is thus also possible for the indentation 6 to be produced by means of simple cutting and bending steps.

In the exemplary embodiment illustrated, the profiled leg 2, which forms the top boom, and the profiled leg 4, which forms the bottom boom, are connected rigidly to the associated longitudinal sides of the central web 3 by means of the connecting lugs 11 to 18. For this purpose a line of rivet connections 19 runs in the longitudinal direction of the section 1 of the longitudinal frame support. In other exemplary embodiments of the invention, it is also possible for screwed connections or spot-welded connections to be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Profiled vehicle supporting frame member having a longitudinally extending load supporting central web which is flanked on at least one side by an angled profiled leg, and having at least one angled portion, wherein:

the central web and the at least one profiled leg are separate elements which are connected rigidly to one another;

the central web is configured in the form of a plate which is bent to form the at least one angled portion;

the at least one profiled leg is configured as a single-piece blank which is continuous over the length of the supporting frame member and has a continuous flange web, which follows the at least one angled portion, and a plurality of connecting lugs which adjoin one another and are separated from one another in a region of the bends of central web; and the connecting lugs are bent at right angles to the flange web and are connected rigidly to an associated longitudinal side of the central web.

2. Profiled support according to claim 1 wherein the central web is formed as a single piece.

3. Profiled support according to claim 1 wherein the central web comprises a plurality of separately formed parts.

4. Profiled support according to claim 1 wherein:

at least one substantially planar longitudinal edge contour of the central web has an angled portion, whereby a width of the central web is varied;

the continuous flange web of the associated profiled leg is bent so that it conforms to the edge contour of the central web; and an associated one of the connecting lugs is coordinated with the length of the indentation.

5. Profiled support according to claim 1 wherein the central web and the at least one profiled leg are produced from different materials.

6. Profiled support according to claim 1 wherein the at least one profiled leg is connected rigidly to the central web by a multiplicity of fastening elements, selected from the group consisting of rivet connections and screws, which are distributed over the length of the profiled support.

7. Process for making a supporting frame member for a commercial vehicle, comprising:

providing a longitudinal extending load bearing planar central web;

bending the central web out of its plane to form at least one angled portion;

attaching to at least one longitudinal edge of the central web a profiled leg which is continuous over the length of the profiled support member, said profiled leg comprising a single-piece plate, with a plurality of connecting lugs and a continuous flange web which follows the angled portion, the connecting lugs being separated from one another in the longitudinal direction of the profiled leg by incisions which are provided adjacent bending edges of the at least one angled portion, bent at right angles to the flange web, and connected rigidly to the at least one longitudinal edge of the central web.

8. Process according to claim 7 further comprising:

providing at least one substantially planar longitudinal edge contour of the central web with an angled portion, whereby a width of the central web varies; and dimensioning a particular connecting lug adjacent the angled portion of the central web by selection of the incisions such that a length of the particular connecting lug is coordinated with a length of the indentation.

9. A profiled vehicle supporting frame member, comprising:

a central longitudinally extending web configured in the form of a plate which is bent to form at least one angled portion; and first and second longitudinally extending profiled members disposed on laterally opposite longitudinal edges of said central web, each of said profiled members having continuous flange web which is continuous over a length of the supporting frame member, extends substantially perpendicularly to the central web and conforms to the at least one angled portion, and each of said profiled members having a plurality of connecting lugs which adjoin one another, are separated from one another in a region of bends in the central web, and project perpendicularly to the flange web;

wherein said first and second profiled members are formed as discrete elements separate from the central web and are rigidly connected to said opposite longitudinal edges of the central web.

* * * * *